Sept. 2, 1930.  E. K. DEWEY  1,774,965
ELECTRODE FOR THE ELECTRIC ARC
Filed July 6, 1925
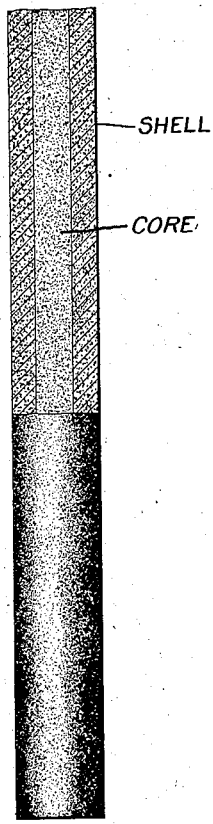
Inventor:
Ernest K. Dewey,
by Charles E. Tullar
His Attorney.

Patented Sept. 2, 1930

1,774,965

UNITED STATES PATENT OFFICE

ERNEST K. DEWEY, OF SCHENECTADY, NEW YORK, ASSIGNOR TO GENERAL ELECTRIC COMPANY, A CORPORATION OF NEW YORK

ELECTRODE FOR THE ELECTRIC ARC

Application filed July 6, 1925. Serial No. 41,886.

My invention relates to electrodes for the electric arc, and more in particular to electrodes for the so-called high intensity type of arc. One form of such electrode is shown in elevation and partly in section in the accompanying drawing. Heretofore, cored, high intensity electrodes have been made adapted to carry a load of 150 amperes at a voltage as high as 78 volts. Electrodes of this type consist of a shell about 16 mm. in diameter and 8 mm. core. This shell is composed of calcined coke and lamp black and a necessary binder such as coal tar. This electrode is provided with a core which is composed of a mixture of lamp black and a mineral salt.

It is the object of my invention to provide an electrode which will permit the use of a current as high as 250 amperes or over and which will give a steady intense light, possibly 100% stronger than when standard electrodes are used.

In order to accomplish the foregoing I use electrodes of the cored type, the details and ingredients of which are as follows:

For the usual core I substitute one which contains a mixture of cerium oxide, cerium fluoride, tungsten carbide, boric oxide and carbon. In connection with these ingredients I also use a binder, such as tar.

I find that excellent results are obtained by using the following proportions of the ingredients for the core: cerium oxide 27%, cerium fluoride 18%, tungsten carbide 5%, boric oxide 1%, carbon 49%. This carbon may be in the form of fired lamp black. The binder may be as high as 25% of the total weight of the ingredients of the core, and even as high as 30%. By using electrodes of this sort in an arc lamp and in which the positive electrode is 16 mm. in diameter, the arc may be operated with a current flow of about 150 amperes, and even as high as 250 amperes, thereby increasing the amount of light very materially, even as high as 100% over that obtained when the electrodes of the prior art are used. Notwithstanding the great volume of current, the arc, when using electrodes of my invention burns quietly and steadily, the arc being free from any objectionable smoking, as is the case when electrodes of other types are used.

While I have described my invention in connection with certain specific proportions and elements, it will be understood that I do not wish to be limited to the specific proportions and elements named, inasmuch as, in view of the disclosure, such elements and proportions may be varied somewhat without departing from the spirit of the invention or from the scope of the claims contained herein.

What I claim as new and desire to secure by Letters Patent of the United States is:

1. An electrode for an arc having a carbon shell and a core, said core consisting of a mixture of cerium and boron compounds, together with carbon, cerium fluoride and tungsten carbide.

2. An electrode for an arc having a carbon shell and a core, said core consisting of a mixture of boric oxide and carbon, together with cerium oxide, another cerium compound and a tungsten compound.

3. An electrode for an arc having a carbon shell and a core, said core consisting of cerium oxide 27%, cerium fluoride 18%, tungsten carbide 5%, boric oxide 1% and carbon 49%.

4. An electrode for an arc having a carbon shell and a core, said core consisting of cerium oxide 27%, cerium fluoride 18%, tungsten carbide 5%, boric oxide 1%, and carbon 49%, and a binder for the ingredients of the core, said binder being 20% by weight of the ingredients.

5. An electrode for an arc having a shell, a core within said shell, said core consisting of a mixture of comparatively large proportions of both a cerium compound and carbon, a small proportion of a boron compound, and cerium fluoride and tungsten carbide, the proportion of the cerium fluoride being comparatively large and the proportion of the tungsten carbide being comparatively small.

In witness whereof, I have hereunto set my hand this 3rd day of July, 1925.

ERNEST K. DEWEY.